United States Patent
Smithwick et al.

(10) Patent No.: US 8,692,738 B2
(45) Date of Patent: Apr. 8, 2014

(54) ADVANCED PEPPER'S GHOST PROJECTION SYSTEM WITH A MULTIVIEW AND MULTIPLANAR DISPLAY

(75) Inventors: Quinn Smithwick, Pasadena, CA (US); Lanny S. Smoot, Thousand Oaks, CA (US); Daniel Reetz, North Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 496 days.

(21) Appl. No.: 13/157,432

(22) Filed: Jun. 10, 2011

(65) Prior Publication Data
US 2012/0313839 A1  Dec. 13, 2012

(51) Int. Cl.
*G09G 5/00* (2006.01)
(52) U.S. Cl.
USPC .................................. 345/6; 345/4
(58) Field of Classification Search
USPC .......................................................... 345/6
See application file for complete search history.

(56) References Cited

U.S. PATENT DOCUMENTS

| | | | |
|---|---|---|---|
| 6,377,229 B1 | 4/2002 | Sullivan | |
| 6,481,851 B1 * | 11/2002 | McNelley et al. | 353/28 |
| 7,883,212 B2 | 2/2011 | O'Connell et al. | |
| 2003/0214459 A1 * | 11/2003 | Nishihara et al. | 345/6 |

* cited by examiner

*Primary Examiner* — Charles V Hicks
(74) *Attorney, Agent, or Firm* — Marsh Fischmann & Breyfogle LLP; Kent A. Lembke

(57) ABSTRACT

An apparatus for displaying virtual objects within a physical set or scene. The apparatus includes a set assembly including at least one physical object, e.g., a background prop. A virtual object display assembly is provided with: a display element with a screen operable to display an image of an object; a beam splitter positioned at an angle between the screen and the set assembly; and a mask display element positioned within the set assembly at an image plane associated with the displayed image. The mask display element operates, when the display element operates to display the displayed image, to display a mask corresponding to the displayed image. The beam splitter is transmissive and reflective of light. The mask display element is positioned between the beam splitter and the physical object, and the displayed mask occludes a portion of the physical object and casts a shadow within the set assembly.

24 Claims, 5 Drawing Sheets

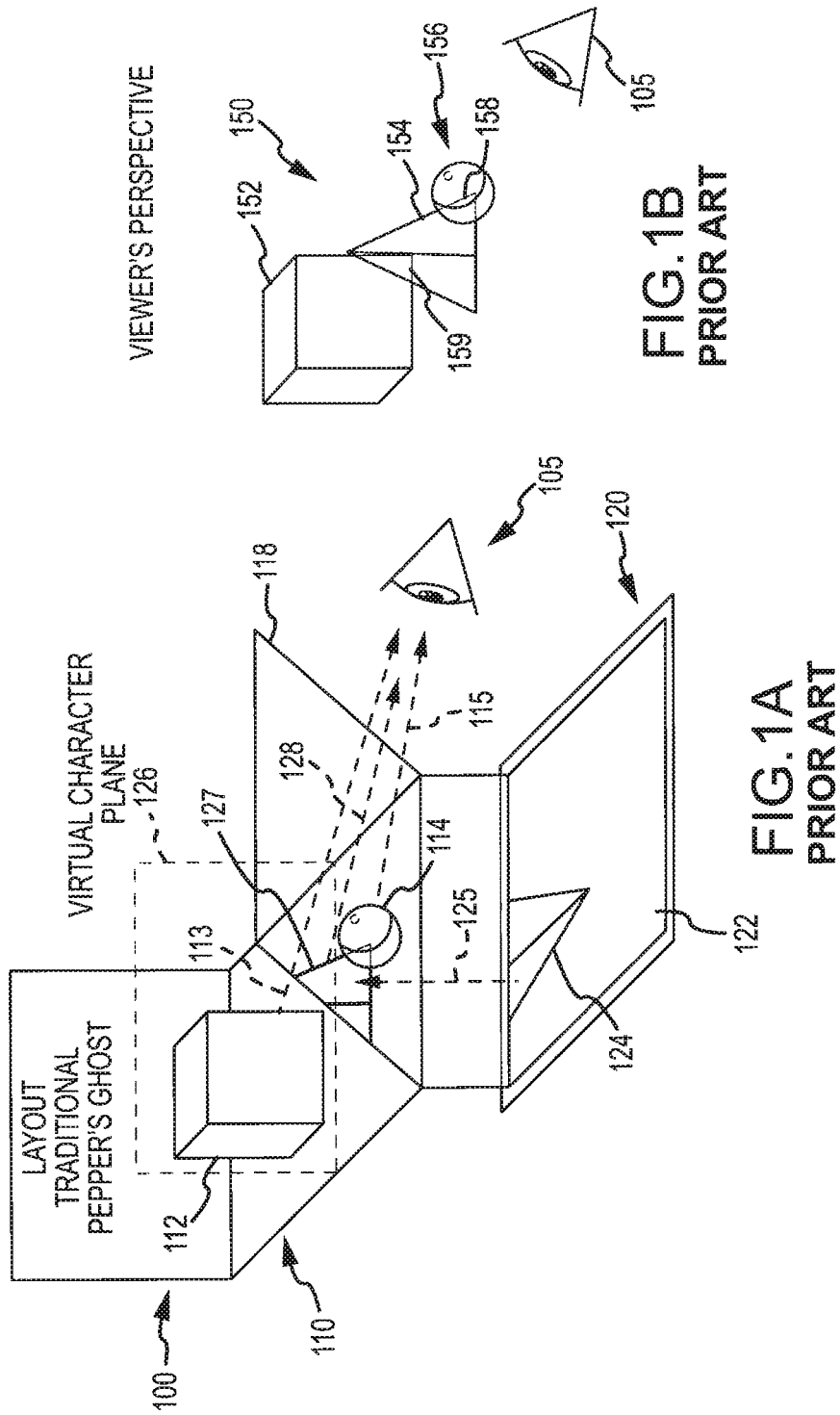

ADVANCED PEPPER'S GHOST PROJECTION SYSTEM WITH A MULTIVIEW AND MULTIPLANAR DISPLAY

BACKGROUND

1. Field of the Description

The present invention relates, in general, to projecting or displaying video/animated or still three dimensional (3D) images, and, more particularly, to autostereoscopy and autostereoscopic projection systems such as those adapted to display ghost or latent 3D images without requiring accurate tracking of a viewer's right and left eye or glasses, headgear, or other equipment that has to be worn or used by a viewer.

2. Relevant Background

There are numerous entertainment and other settings where it is desirable to create a unique visual display. For example, theme or amusement parks may include rides or walk-through attractions where guests (or "viewers") are entertained by a unique visual effect or illusion. Pepper's ghost is an illusionary technique used by magicians, by ride or attraction designers, and others to produce a 3D illusion of a latent or ghost-like image. Using a simple piece of plate glass and special lighting techniques, Pepper's ghost systems can make objects appear and disappear within a scene or room.

Generally, these systems include a main room or scene that is readily viewed by a guest or viewer and a hidden room that is not visible to the viewer, and both rooms may be identical in their physical structure including furniture and other objects except the hidden room may include additional objects or characters such as a ghost. A large piece of glass or a half-silvered mirror is situated between the viewer and the scene at an angle, such as at about 45 degrees. When the main room is lit and the hidden room is darkened, the viewer only sees the main room as the hidden room does not reflect from the glass and the sheet of glass is itself hard to see as it typically extends across the entire view of the main room.

Pepper's ghost then becomes very visible to the viewer when the entire hidden room or portions such as the ghost or other character are brightly lit. Since only a portion of the light cast upon the ghost or other objects in the hidden room is reflected from the glass, the reflected images appear as latent or ghostly images relative to the objects in the main room (e.g., the reflected images or images superimposed in the visible room may appear to float). The Pepper's ghost image is a 3D image that may be a still image or animation may be provided such as with animatronics providing the "ghost" or by placing a live actor in the hidden room. In many current systems, a 2D display is used as it is more dynamic and controllable and does not require a live actor or expensive animatronics. However, this results in a 2D image or flat object being positioned within a 3D set (e.g., the main room). In a broad sense, the Pepper's ghost systems may be thought of as implementing autostereoscopy, which is generally a method of displaying 3D images that can be viewed without the use of headgear or glasses on the part of the user.

FIGS. 1A and 1B illustrate a traditional layout for a Pepper's ghost display 100 for use in creating a 3D display 150 for a viewer 105. The display 100 includes a display scene or real world set 110, and a background prop 112 and a foreground prop 114. The props 112, 114 are physical objects such as pieces of furniture that a "ghost" may walk among or, as shown for simplicity's sake, a box 112 and a ball 114. A sheet or piece of glass (e.g., a beam splitter) 118 is positioned at an angle (e.g., 45 degrees) between the scene 110 and the expected or planned position of the viewer 105 (or the viewer's point of view (POV)) or an outer display surface/window. The glass is at least partially transparent such that the background prop 112 and the foreground prop 114 are visible through the glass 118 as light 113, 115 travels through the glass 118 to the viewer or viewer's eyes 105. A display 120, such as a typical 2D monitor or a hidden room/scene that can be selectively lit, is provided in the display 100 and is used to display an image 124 such as the two-dimensional pyramid shown in FIG. 1A. The foreground prop 114 is in front of the "ghost" in image plane 126 but behind the beam splitter/glass pane 118.

Light 125 travels toward the beam splitter 118 where it is reflected 128 from the front (or viewer-side) of the beam splitter 118 toward the viewer 105. In this manner, a reflection 127 of the displayed image 124 is visible by the viewer 105 concurrently with light transmitted from the props 112, 114, and the reflection 127 may appear to be located (e.g., as a "ghost" or virtual image) between the background prop 112 and the foreground prop 114 through proper spacing of the display surface 122 relative to the front surface of the glass 118 and the locations of the props 112, 114. An additional foreground prop could be provided in front of the glass 118, and such a prop would occlude the "ghost" on plane 126 and background objects such as prop 112.

In the traditional Pepper's ghost display 100, a partially reflecting pane of glass or beam splitter 118 is used to overlay reflections 127 of a physical object or images 124 from a video or still monitor 120 on a real world scene 110. As shown in FIG. 1B, the reflected object 154 may be positioned between the background prop 152 and the foreground prop 156 from the perspective of the viewer 105, e.g., the virtual character/object plane 126 is between props 112, 114 in scene 110. Unfortunately, the virtual image (or reflection of the virtual or displayed object 124) 154 is semi-transparent (or translucent) and low contrast. This can be seen in FIG. 1B with the background object 152 being visible at 159 through the virtual image 154. Further, the image 154 appears flat or two-dimensional and is incapable of casting its own shadow as would be expected of a solid object in scene 110. The 3D effect is also spoiled in part when the reflection 127 is in front of the foreground image 156 as shown at 158. The translucence, lack of shadows, and flat appearance combine to spoil or hinder for a viewer 105 the illusion of a solid, virtual object integrated into the scene 110.

Hence, there remains a need for improved visual display techniques and systems such as for creating or projecting 3D images. Preferably, such an advanced Pepper's ghost display system would provide a higher contrast, solid or opaque-appearing, and 3D dimensional virtual character that can be interspersed or located among/between physical props such as physical foreground and background props. Further, in some cases, it may be useful for the advanced Pepper's ghost display system to be adapted such that displayed virtual objects (or images viewable by an observer) are capable of occluding physical objects (e.g., prevent portion 159 of background prop 152 from being viewed by viewer 105), of being occluded by physical objects in front of them or in front of the virtual character plane 126 (e.g., prevent potion 158 of virtual object 154 from being viewed on or in front of foreground prop 156), and of casting true dynamic shadows.

SUMMARY

The present invention addresses the above problems by providing an advanced Pepper's ghost display system (and corresponding projection/display methods) that incorporates dimensional virtual objects (such as a character) into real world scenes or sets. The display system is configured to allow multiple observers or viewers to view the scene or 3D set that includes the virtual object(s) without the need for 3D glasses or other 3D technologies and the viewed scene or set includes mutual occlusion effects ("mutual" in that the virtual image occludes background images behind the virtual image plane and foreground objects positioned in front of the virtual image plane in the real world set occlude the virtual image).

To this end, the multiplanar display system includes a dynamic mask display element for selectively providing an opaque or semi-opaque mask with a shape matching or selected to match a portion of the virtual object. The virtual object may be 3D so that in the case of a 2D mask a silhouette may be used as it is difficult to match the 3D shape with a 2D mask. The dynamic mask is opaque to block the background, but it could also be semi-opaque if some semi-transparency is desired (e.g., a portion of a component may be semi-transparent such as a portion of a helmet or the like). The mask display element is placed or positioned in the real world set or scene so as to coincide with the location of the virtual image plane, and it may take the form of a liquid crystal display (LCD) panel (or a portion of such a panel that has been modified to be transparent and to remove backlighting) or similar planar device that is transparent in portions not dynamically or selectively operated to provide the mask. The mask could be a 3D mask (phantom object) in other implementations rather than a planar device. For example, if a display were desired for a static object, such as a talking car that does not move except for its mouth and eyes, a black car could be provided in the physical set to block the background, and then the display system may be used to provide a Pepper's ghost in the color and face animation. In other display systems, non-planar 3D displays may be used to provide a 3D mask (such as a spinning LCD panel).

The mask display element is operated selectively to display (such as concurrently with a display of the virtual object) a dynamic mask that is placed in the real world scene or set to provide a matched silhouette of the virtual object or character against the background. The dynamic mask causes the reflection of the virtual image to appear to be solid with high contrast. The dynamic mask provided in the mask display element also provides occlusion with physical objects (e.g., for objects behind it and the light source) and provides a virtual object that can cast shadows when light from ambient or other light sources strike the mask display element. In some embodiments, the display system includes a multiplanar display assembly rather than a 2D monitor/display element to produce 3D or dimensional characters or objects. Further, in some embodiments, a multi-view, multiplanar display assembly is used to produce 3D objects with a wider field of view. Generally, any autostereo display may be used to produce the 3D or dimensional characters or objects such as a lenticular display, a swept volumetric display, or a light field display.

The described display systems provide at least three unique and new aspects: an LCD mask; one or more phantom masks; and a 3D multiplanar display providing the "ghost" images or input images into a set with physical props. Prior video-based displays provided or displayed a 2D Pepper's ghost that was transparent, was low-contrast, and did not cast shadows. In the display systems of the present description, the LCD mask in the Pepper's ghost set is provided at the plane of the virtual character and allows the virtual character to be opaque, to be high contrast, and to cast shadows. This is all achieved without the need for modeling the scene or tracking the user's viewpoint.

Next, the inclusion of phantom masks in the display system allows foreground objects between the beam splitter and the "ghost" to occlude the ghost. Even if the ghost is transparent, it would still be expected to be occluded by foreground objects, otherwise it would not hold a definitive location in the set (e.g., there would be inconsistencies between depth and occlusion cues). The traditional or prior Pepper's ghost display devices do not handle this case. In the display system, a second display is included to add 3D which is another added effect and benefit of the systems described herein. Providing 3D imagery may be done with any autostereoscopic display (lenticular, multiplanar, swept volumetric, other light field, or the like). One useful, but not limiting, implementation is to use a multiplane display. Further, many of the embodiments described include a beam splitter between the multiplane display (or other autostereoscopic display) but this is not required to practice the invention. In some embodiments, a non-beam splitter technique is used such as a combination of a transparent OLED with an LCD mask.

More particularly, an apparatus is provided for projecting or displaying images to a viewer that appear to be within a physical or real world set or scene. The apparatus includes a set assembly including at least one physical object (e.g., a background prop, a backdrop display element/screen, or the like). The apparatus also includes a virtual object display assembly that includes: (a) a display element with a screen operable to display an image of an object; (b) a beam splitter positioned at an angle between the screen and the set assembly; and (c) a mask display element positioned within the set assembly at an image plane associated with the displayed image.

Typically, the mask display element operates, when the display element operates to display the displayed image, to display a mask corresponding to the displayed image (e.g., the two display elements operate concurrently). The beam splitter is at least partially transmissive and reflective of light (e.g., a half-silvered mirror or the like), and an outer surface of the beam splitter reflects light from the display element including the displayed image away from the set assembly such as toward a viewer/observer looking through a viewing or display window. The mask display element is positioned between the beam splitter and the physical object in the set assembly, and the displayed mask occludes a portion of the physical object and casts a shadow within the set assembly.

In some embodiments, the mask display element includes a plurality of programmable pixels selectively operable to be transparent or to at least partially block light (e.g., gray scale to black), and the pixels associated with the displayed mask are programmed or operated by a display controller to at least partially block light. The pixels, for example, may be liquid crystal pixels (e.g., the mask display element can be provided with portions of a LCD panel that is modified to remove components but retain a polarizer, the LC pixels, and an analyzer portion).

In operation, the displayed mask has a shape, size, and orientation matching the displayed image in the image plane. Further, the beam splitter comprises a planar sheet of material and has a transmissivity to light of about 50 percent, and the display screen is orthogonal to the mask display element with the beam splitter positioned between the screen and the mask display element at an angle of about 45 degrees. In other embodiments, a beam splitter of differing transmissivity is utilized while in some cases the beam splitter is arranged at an angle other than 45 degrees.

In some embodiments, the set assembly further includes an additional physical object positioned at a location between the mask display element and the beam splitter (e.g., a foreground prop). To provide mutual occlusion, the virtual object display assembly includes an occluding mask positioned between the display element screen and the beam splitter. This mask may be a 2D silhouette of the foreground prop and it may be positioned at a location corresponding to the location of the additional physical object relative to the beam splitter (e.g., the foreground prop and its paired occluding mask are positioned about equal distances from the beam splitter or the mask is at the image plane of the foreground prop), the occluding mask having a size and shape corresponding with the additional physical object. In this manner, the occluding mask blocks a portion of light of the displayed image from striking the beam splitter (as would the foreground prop if the virtual object were truly placed in the physical set or scene). Ideally, in some cases, the mask is a black 3D object (phantom) matching the 3D virtual object. A 2D silhouette may be used, though, to approximate it from the front view and narrow viewing angles. The 2D silhouette may also be a LCD panel too if the prop moves. Also, this means the mask overlays the real foreground prop for all viewpoints and travels with it as the viewer's head moves so it has correct perspective and parallax. This is in contrast to some masks (placed at locations not "collocated" with its paired object) that are therefore view dependent (e.g., they mask an object and do not line up except for one viewpoint or their apparent size only matches from one viewing distance).

BRIEF DESCRIPTION OF THE DRAWINGS

FIGS. 1A and 1B illustrate a traditional Pepper's ghost display device (or layout) and a viewer's perspective (or the resulting displayed imagery) of the display device output, respectively;

DETAILED DESCRIPTION

Briefly, embodiments described herein are directed toward a 3D display system (or advanced Pepper's ghost display system) that is adapted to address problems with prior beam splitter displays, such as conventional Pepper's ghost displays, including the translucence of the reflected virtual object or character and the inability of this virtual object to occlude background objects or to cast a shadow. Briefly, the display system works by placing a dynamic mask at the reflected virtual image of a multiplanar display. The dynamic mask provides a matched silhouette of the virtual object (e.g., a character provided on a display or monitor screen reflected by a beam splitter to a viewer) against the background. In some cases, a transparent emissive display (transparent OLED displays) is used to provide the ghost image rather than a display combined with a beam splitter (e.g., a non-splitter implementation), and these embodiments are useful as it allows one to put a virtual character within the physical set without using a beam splitter. In these cases, though, the display system would still need a dynamic mask (e.g., an LCD mask) to provide occlusion, high contrast and shadows.

The dynamic mask, which may be provided on a liquid crystal display (LCD) panel or the like, provides a dark "empty" area that is aligned and/or matched with the shape, size, and location of the reflected object (or with the object's location in the reflected image plane in a real world set or scene) such that the object's reflected image appears to a viewer to be solid and to have high contrast. The dynamic mask is also capable of occluding background objects and casting shadows when exposed to light in the real world set. The virtual object may be created by use of a single display element (e.g., a conventional monitor displaying a 2D character or object on its screen). In other embodiments, though, a multiplanar, dimensional display assembly is used to provide a minimalistic volumetric display that produces images for reflection by the beam splitter that have depth, coupled vergence/accommodation cues, and some parallax.

Figures 2A, 2B:
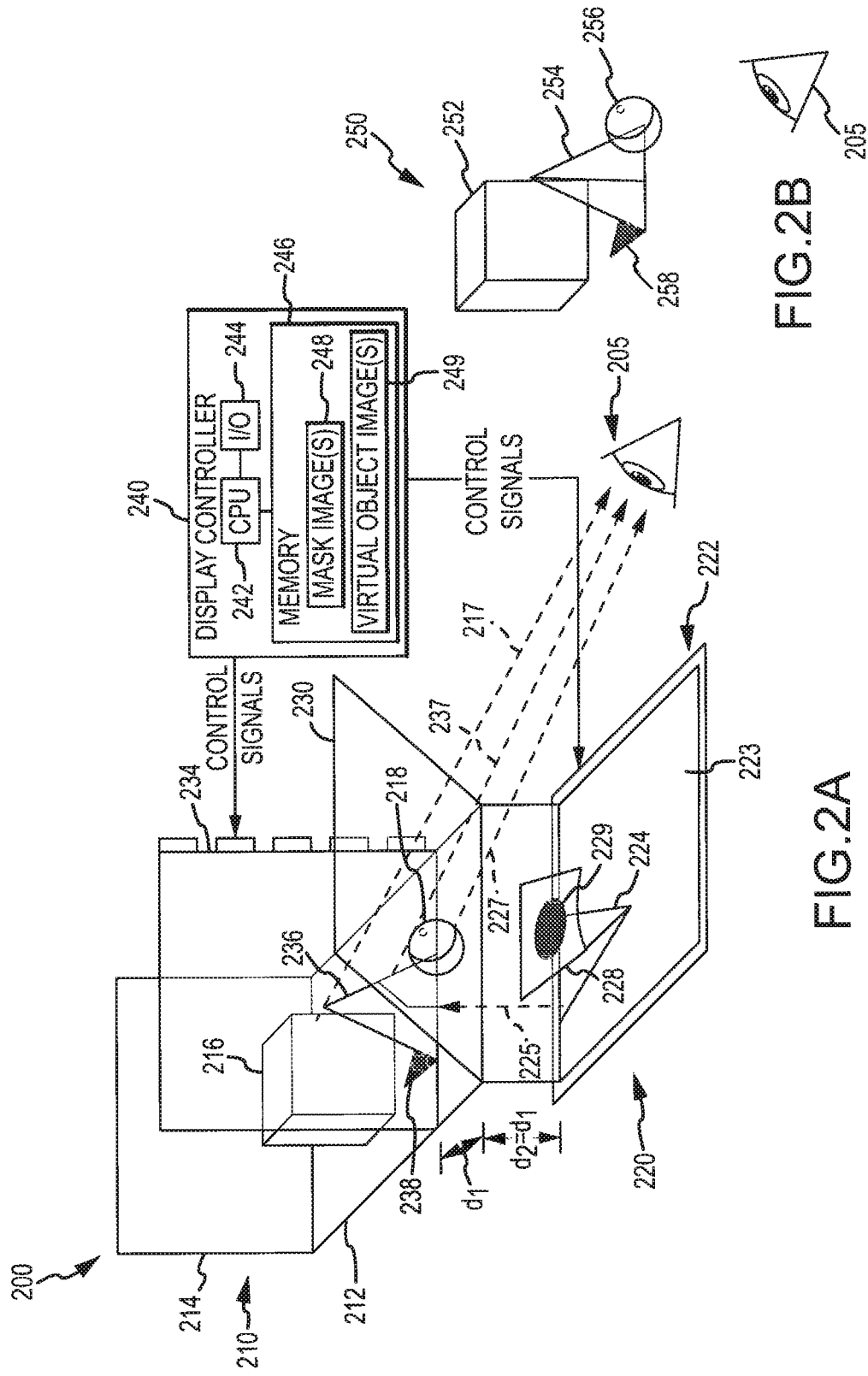
FIGS. 2A and 2B illustrate, similarly to FIGS. 1A and 1B, an advanced Pepper's ghost display system (or layout) in schematic and a viewer's perspective or view of the display system's output imagery.

FIG. 2A illustrates an advanced Pepper's ghost display system (or, more simply, 3D display system) 200 of one embodiment of the invention, and FIG. 2B illustrates an output imagery 250 of the display 200 from a perspective of a viewer 205. As shown, the display system 200 is generally made up of a real world set or scene 210 and a virtual object display assembly 220 that function together to create an output or display 250 viewable or visible to a viewer 205.

The real world set 210 includes a base or bottom support 212 and a backdrop or rear wall 214. The rear wall 214 may be dark or black in some embodiments of system 200, but this is not required. The rear wall 214 may be a painted backdrop, a projection screen (with projected imagery), or a display. If an LCD display is used as wail 214 an additional ¼ waveplate is provided over the wall 214 so the LCD display's image could appear through the LD mask 234. The real world set further includes a background prop 216 and a foreground prop 218 on the bottom support 212. The props 216, 218 typically are 3D objects or actual physical structures such as the box and ball shown in FIG. 2A but may also be dynamic and even live actors, and the background prop 216 is positioned proximate to the rear wall 214 while the foreground prop 218 is spaced apart and located apart from the rear wall 218 (e.g., closer to the viewer 205 and beam splitter or glass pane/sheet 230). The props 216, 218 are provided to create depth within the real world set 210 for the viewer 205 and, typically, to provide real world objects for a virtual object or character to interact with or be positioned by within the set 210. The foreground prop 218 may have a back side (side facing the LCD mask element 234) that is blackened or painted black such that this back side is not reflected by the LCD panel or display element 234.

The virtual object display assembly 220 is used to create a displayed or viewable virtual object 254 as shown in FIG. 2B that is positioned between a displayed background prop 252 and a displayed foreground prop 256. When used in conjunction with dynamic mask 234, the displayed virtual object 254 appears solid (or non-translucent) with high contrast and, as a result, it can occlude the displayed background prop 252. Further, the virtual object 254 is able to throw or cast its own shadow 258, which would be expected of an actual object and not of a virtual object. Still further, from the perspective 250 of the viewer 205, the foreground prop 256, which is closer to the viewer 205 than the virtual object 254, is able to occlude or block a portion of the displayed/viewed virtual object 254.

Hence, the virtual object 254 is displayed or generated by the display system 200 with "mutual occlusion" in that it can occlude objects and it can be occluded from view by other objects.

To provide this displayed virtual object 254, the assembly 220 includes a display or monitor device 222 with a display screen 223. Again, though, a transparent emissive display such as a transparent OLED may be used in front of the LCD panel in a real world set to remove the need for the beam splitter 230. The display 222 may take any conventional form such as an LCD or other monitor (with or without high definition (HD)) used in conventional or well-known computer systems or may take the form of a television. The display 222 is operated by control signals (e.g., image transmissions) by a display controller 240. The display controller 240 may be a computer system (e.g., a personal computer or the like) with a processor 242 managing operations of input/output (I/O) devices such as a keyboard, a mouse, a touchpad, a touch screen, and a monitor to allow an operator to selectively operate the display 222 and dynamic mask display element 234 or such operations may be controlled by software programs or code (not shown by understood to be) run by the processor 242.

The processor 242 also manages memory 246 of the controller 240 to access virtual object images 249 that it uses to generate the control signals provided to the display 222 (e.g., to generate or display a particular image 224 on display screen 223). The memory 246 may also store mask images 248 that are used to generate control signals transmitted by the controller 240 to the dynamic mask display element 234 (e.g., concurrent with operation of the display 222 with matched or paired images 224, 236). Instead of using memory 246, the images 248, 249 may come from another image source in communication with the controller 240 in a wired or wireless manner. The digital images 249 may be black and white or color and may be still or video images.

As shown, operation of the display 222 by the controller 240 causes a virtual object 224 to be displayed upon the screen 223 (e.g., a portion of the display screen 223 transmits light creating a 2D image 224). The assembly 220 further includes a beam splitter 230 that is positioned between the real world set 210 (and its props 216, 218) and the viewer 205. The beam splitter 230 may be a glass sheet or plate with a reflective coating (e.g., a 50/50 coating or the like) or may be formed of a polyester film made from stretched polyethylene terephthalate (BoPET), metalized plastic, or the like, and the beam splitter 230 is planar and is positioned at an angle, θ, relative to a viewing surface/window or viewing plane (not shown) which may be 45 degrees (with the viewing surface/plane shown as a plane perpendicular to the base 212 of the real world set 210) or another useful angle. The display screen 223 is typically parallel to the base 212 of the real world set 210 and is offset a distance, $d_2$, below the base 212 and the base of the beam splitter 230, and the offset distance, $d_2$, is selected to match (the offsets are "equal" (i.e., within some allowable tolerance such as plus/minus 5 percent to allow for manufacturing/assembly tolerances)) a distance, $d_1$, between the beam splitter 230 and the virtual object plane.

The virtual object plane is the plane in which the reflection of the image 224 appears to be located to the viewer 205 within the real world set 210. The reflection of the displayed image 224 is created as light 225 from the display screen 223 travels to the front or outward-facing surface of the beam splitter or glass pane 230. A portion of the light 225 is reflected as shown at 227 toward the eyes of the viewer 205, which allows the viewer 205 to perceive the output 250 including the virtual object 254. Concurrently, the viewer 205 is able to view light 217 bouncing off of the background prop 216 and light 219 from the foreground object 218 as this light is transmitted through the beam splitter 230 (e.g., the splitter 230 is transmissive and reflective of light), and this allows the viewer 205 to view the displayed images 252, 256 in the display output 250 with the virtual object 254.

To allow the virtual object 254 to block light 217 from the object 216 and cast a shadow 238/258, the virtual object display assembly 220 further includes a mask display element 234. The mask display element 234 is a planar member that is aligned (or substantially aligned within accepted tolerances) with the virtual image plane ($d_1=d_2$), in this case, between the background and foreground props 216, 218. In some cases, though, the element 234 is curved or otherwise non-planar while in some cases the mask element may even be three dimensional or a volumetric mask or be a rotating LCD panel. The mask display element 234 is configured to be transparent to light (such as light 217 from background object 216) except in areas that are activated or operated by control signals from controller 240 to dynamically display or generate a mask 236 associated with the displayed object image 224 on screen 223. The mask display element 234 may be an LCD panel or other device. In one prototype, the display element 234 was formed using a modified LCD monitor to include a polarizer, the LC pixels, and the analyzer portion, but it is expected that many other configurations for the mask display element 234 may be used to dynamically create or provide the mask 236 when the display 222 is operated to display image 224 of a virtual object.

Typically, the mask 236 will be the same size and shape and have the same orientation as the image 224. For example, when the object 224 is a triangle as shown, the mask 236 will also be a triangle with similar (or identical in many applications) dimensions/geometry and orientation. The mask 236 is configured to block at least a portion of light such as light 217 from prop 216 to at least partially occlude the object 252 as shown in FIG. 2B and also to at least partially block ambient or other light to cast a shadow 238 as shown at 258 in displayed output 250. In other words, the mask 236 may be black (or another color blocking light) or a lower number on the gay scale to be at least partially transparent (translucent) to light. The controller 240 may use the control signals using the retrieved mask image 248 to turn a set of pixels on/off (black/clear) or to provide shading in some areas of the mask 236 to provide a desired effect (such as partial occlusion in areas of the virtual object 224 that may be expected to be translucent such as a plastic face mask of a helmet or the like). Light 237 from or passing through the mask 236 may be transmitted through the beam splitter 230 to the viewer 205 for viewing with the reflected light 227 and the transmitted light 217, 219 from props 216, 218 (or other portions of the real world set 210).

To provide mutual occlusion, the virtual object display assembly 220 may further include a real occluding mask 229 provided on foreground mask display element 228. The element 228 may be configured for dynamically creating the mask 229 (e.g., an LCD panel and any displayed imagery/silhouettes provide a masking component) as is the mask display element 234 or may be a static element (e.g., a glass or plastic sheet with the mask 229 painted, printed, or otherwise provided on its surface(s)). The foreground occluding mask 229 is shaped and sized to match the foreground prop 218 and is also located a distance from the splitter 230 matching the distance of the prop 218 from the splitter 230. As a result, the mask 229 functions to block a portion of the light 225 from the display screen 223 of the virtual object 254 such that the output 254 provided by reflected light 227 to the viewer 205 appears to be properly occluded by the displayed/viewed foreground image 256. A 2D mask 229 may be used as shown in FIG. 2A while other embodiments may use a duplicate physical object (e.g., one painted black to provide a "phantom" duplicate object) positioned between the display screen 223 and the beam splitter 230 (e.g., if a ball is provided for prop 218, a similar ball may be used to mask 229 the light 225 from striking the splitter 230 and being reflected 227 to the viewer 205). As will be understood, the image 224 and mask 236 may be changed simply by the controller 240 selecting differing mask and virtual object images 248, 249 for display on the screen 223 of display 222 and in the mask display element 234.

As described, the advanced Pepper's ghost display system may be thought of as including at least one significant change to the traditional display in which a dynamic mask is placed and selectively provided at the reflected image plane. It may be convenient to think of the dynamic mask as a movable, programmable stencil in the shape of the virtual character's (or object's) silhouette that "knocks out" the background. The resulting dark empty backdrop allows for a high contrast reflected image to be provided via the beam splitter to a viewer. The mask also occludes background objects to create the appearance of solidity. Further, the mask also casts shadows, which adds a sense of weight or thickness to the virtual objects. The result in prototypes tested by the inventors is a solid-looking, high contrast character or object.

Additional masks may be added to allow physical foreground objects to occlude the virtual object. Placement of these masks depends on the location of the corresponding/paired physical object or prop relative to the beam splitter and a display surface/window. If the physical object is between the beam splitter and the observer, then no mask would be needed as foreground occlusion occurs naturally. If the physical object is between the LCD-based dynamic mask and the beam splitter, a mask can be placed in front of the display screen (used to display an image of the virtual object) a distance corresponding with the virtual image of the physical object (where it appears due to reflection), which with a 45 degree splitter may be about equal distances for the object and its mask relative to the beam splitter. From different viewpoints, the mask will stay aligned with the occluding physical object, and correct motion parallax of this mask with respect to the virtual character is handled naturally.

As will be understood by those skilled in the arts, the virtual object displayed with the system 200 is advantageous or desirable compared to displays provided by traditional Pepper's ghost displays as the displayed object appears solid, exhibits mutual exclusion, and also naturally casts shadows while no viewer tracking is needed and it works from all viewpoints. However, the displayed object may still appear to a viewer to be flat or planar within the display output.

To overcome issues with flat imagery, embodiments of the advanced Pepper's ghost display system may, instead of using a single display to provide the virtual object, use an autostereoscopic or dimensional display. For example, a volumetric multiplanar display may be substituted for the single display element to provide a virtual image with depth. The volumetric multiplanar display is relatively simple to implement within the advanced Pepper's ghost display system and is an effective device for producing multiple depth cues.

In one specific implementation, the multiplanar display is implemented using a beam splitter to optically layer images of objects from two displays that are separated by the thickness of the virtual character being generated. Then, using multiplanar anti-aliasing, a virtual pixel may be placed at any depth between the two displays by splitting its intensity among the two displays based on the relative depth of the virtual pixel between the two displays. For more information on this concept, see "Multi-planar Volumetric Display System and Method of Operation Using Three-dimensional Anti-aliasing" by Alan Sullivan, U.S. Pat. No. 6,377,229, which is incorporated herein in its entirety by reference. The character appears to the viewer to be smoothly dimensional, and this 3D image is optically superimposed on the dynamic mask to give the illusion of volume and solidity within some advanced Pepper's ghost display systems.

The use of a multiplanar display that only spans the thickness of the character and is visually collocated with the character's position in the set is advantageous, especially with depth modulated intensity (which may be provided by the controller and the images fed to the two displays). The virtual pixels at different depths exhibit consistent continuous motion parallax within the viewing zone. If the spacing of the two displays is within the viewer's eyes' depth of field (which is likely with a single object/character in a set), inconsistencies in accommodation and vergence can be suppressed. The viewed or output character/object appears natural without eye strain for the viewer. For certain locations of an occluding foreground object, its phantom or real occluding mask may be located within the multiplanar display. In such cases, two phantom masks may be needed or desired: one mask for the front display element and another for the back display element, and the two masks would be placed such that both of their reflections overlay, each other and the occluding foreground object (or foreground object for which the two masks are affecting occlusion of light from the display elements).

Figure 3:
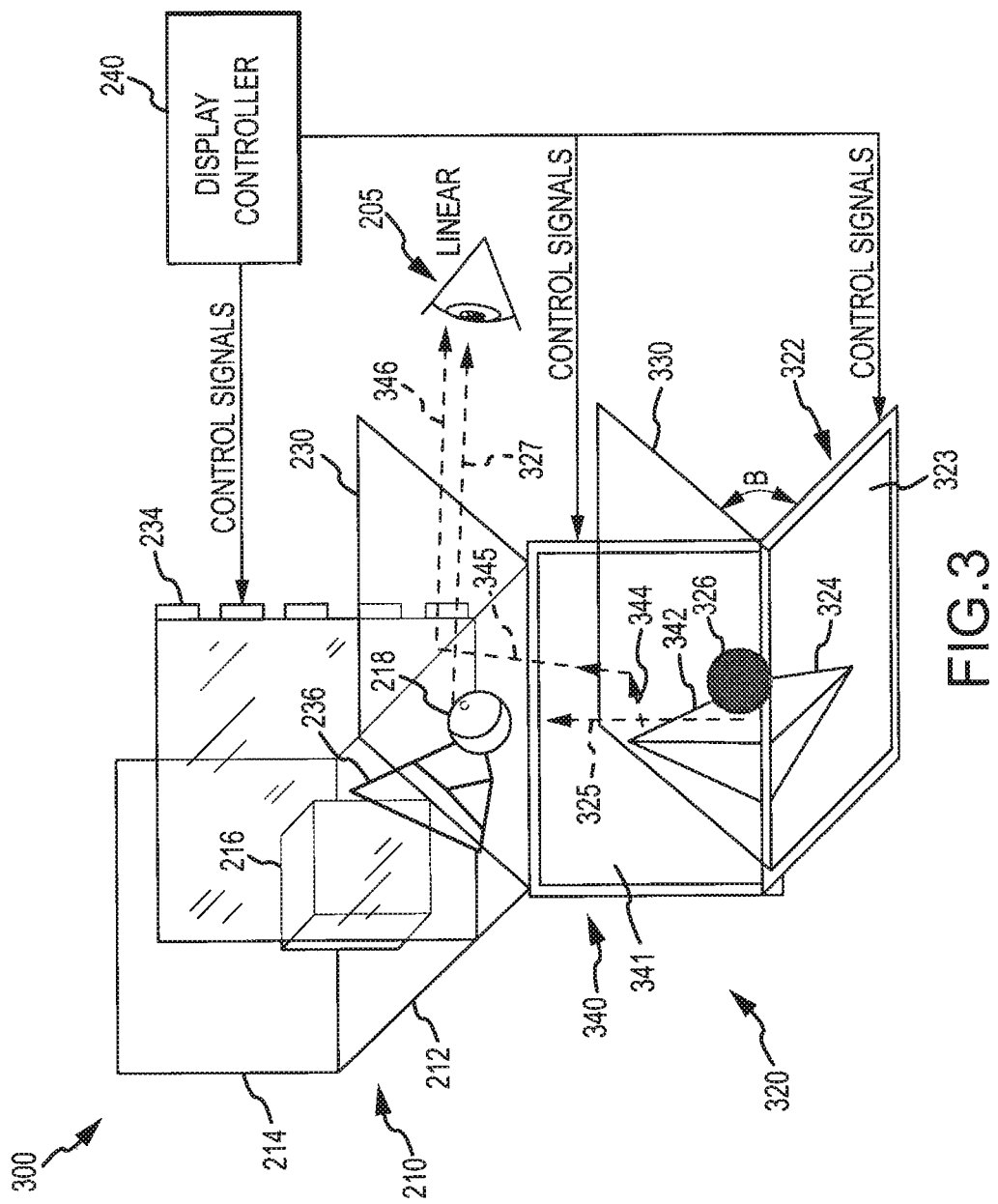
FIG. 3 illustrates an embodiment of an advanced Pepper's ghost display system (or layout) in schematic form showing use of a multiplanar display within the virtual object display assembly to overcome issued with a flat or planar virtual object in the display system output.

FIG. 3 illustrates an advanced Pepper's ghost (or 3D) display system 300 providing a 3D virtual object amongst props or objects in a real world set 210. To this end, many of the components of the display system 200 may be reused or retained, but a different virtual object display assembly 320 is provided that includes mechanisms or devices to provide an autostereoscopic or dimensional virtual object viewable or displayed to a viewer 205 via reflection from the beam splitter 230. As shown, the display system 300 retains the dynamic mask display element 234 that is positioned within the real world set at a location that corresponds with the virtual image plane, and the display element 234 is selectively operated by the display controller 240 to generate or display a black and/or gray scale (partially transparent/translucent) silhouette or mask 236 of the virtual object to provide occlusion of background in the real world set 210 (such prop 216) and to cast shadows 238.

Further, though, the virtual object display assembly 320 replaces the single display 222 with a multiplanar display. The multiplanar display is made up (in this exemplary and non-limiting example) of a first or rear plane display 322 and a second or front plane display 340 (e.g., a pair of HD flat screens or the like). The controller 240 operates the rear plane display 322 to display an image 324, which may have depth modulated intensity, on the screen 323. The image 324 corresponds with the rear or back portion of the virtual object. The controller 240 further operates to cause the front plane display 340 to display an image 342, which also may be configured to provide depth modulated intensity, on the screen 341. The display assembly 320 further includes a beam splitter (such as stretched Mylar™, glass sheet with reflective coating, and the like) 330 positioned between the two displays 322, 340, e.g., at an angle, $\beta$, measured from the plane of the screen 323 such as 45 degrees between orthogonally arranged screens 323, 341 or, in other cases, bisecting the angle defined between the screens 323, 341.

In use of the system 300, light 325 corresponding with the rear image 324 is projected through the beam splitter 330 (which is, again, at least partially transmissive and reflective of light such as 50/50 or some other ratio of light transmission to light reflection) where it is reflected as shown at 327 by the beam splitter 230 in the real world set 210 (or at the display end of the set 210) toward the viewer 205. A 3D occluding object or mask object 326 may be positioned between one or both the screens 323, 341 and the beam splitter 330 to provide occlusion of the 3D object being generated by the display assembly 320 by a foreground prop/object 218 in the real world set 210. Concurrently, light 344 from the front plane display screen 341 that corresponds with the front image 342 is projected toward the beam splitter 330. It is reflected as shown at 345 to be directed toward the beam splitter 230, where it is again reflected as shown at 346 to be directed toward or transmitted to eyes of a viewer 206.

As discussed with reference to system 200, the mask element 234 is positioned such that the mask 236 is in the image plane of the virtual object provided by the screens 323, 341 with images 324, 342 via beam splitter 330. Further, the images 324, 342 are sized and oriented by the control signals from display controller 240 to match each other in size, shape, and orientation. Depth or thickness of the projected image with light/streams 327, 346 is controlled by the relative positioning of the screens 323, 341 relative to the beam splitter 330 as the screens 323, 341 can be moved closer or further away (along an axis orthogonal to the planes of the screens 323, 341) from the beam splitter 330 to make the 3D object perceived by the viewer 205 thinner or thicker, respectively.

In one implementation of the system 300, two matched displays were placed at right angles to each other, e.g., one placed vertically and one placed flat horizontally, to provide the two displays of the multiplanar display. A beam splitter was formed using a glass plate, with a 50/50 reflective coating, positioned at a 45-degree angle between the two screens of the displays. The displays (or their screens) are spaced such that the reflected image of one is slightly displaced in front of the other display such that displayed image of the virtual object is in two planes (e.g., is a multiplanar display). For example, the rear display panel may be spaced apart from the beam splitter further than the front display panel. The multiplanar display (or output of the two display screens) is reflected from a physical set using another beam splitter formed by a glass plate with a 50/50 reflective coating and placed at a 45-degree angle above the two displays (e.g., above the first beam splitter to receiver transmitted and reflected light from the two display screens). These components form the Pepper's ghost of the virtual object or of the multiplanar display.

A transparent LCD panel acts as a dynamic mask in the physical set. The LCD panel is placed at the image of the reflected multiplanar display within the physical set, i.e., to coincide with the image plane of the reflected image of the first or rear plane display. An LCD panel, for example, from a commodity or readily available monitor may be modified so as to increase its transparency, and the LCD panel may be separated from its back light and to have its antiglare film removed to provide the mask display element of the virtual object display assembly. This modified LCD panel, in one embodiment, provides the programmable, dynamic mask for the advanced Pepper's ghost display system.

In some prototypes or implementations of the display system, physical props are placed into the physical set or scene. For example, a background plate (which also may take the form of an LCD display) that is black or that includes background imagery may be provided behind the LCD panel (e.g., further away from a viewer or the outer display surface/window). Such a background or backdrop LCD display may be operated to display background images and a ¼-wave plate polarizing sheet may be provided to rotate pixels to facilitate proper viewing by a viewer after these pass through the LCD panel providing the dynamic mask (e.g., to prevent the background LCD display's images from being extinguished by the dynamic mask's polarizer). Also, background and foreground props may be provided as well as physical objects at the image plane. For example, one implementation includes a physical globe as a background object (behind the image plane/dynamic mask), a split and raised state that straddles the LCD mask panel where the virtual object/character is displayed or perceived as being located in the physical set, and foreground props such as a cube in front of the virtual object/character (or image plane) and two near foreground pyramids (to the side of and not occluding the virtual object image).

Phantom objects (e.g., cubes painted black to match foreground cube prop) are placed near the two display screens of the multiplanar display. These act as masks allowing the foreground cube (or other foreground prop/physical object) to occlude the virtual object or character. Back sides of the props facing the modified LCD panel (mask display element) were painted black to control glare images from appearing in the modified LCD panel and in the display or output of the display system observed by a viewer. In one embodiment, a spotlight was provided behind and above the other components of the physical set and lighting also came from ambient light. Note, LCD panels attenuate light such that lighting provided behind the modified LCD panel or mask display element should typically be controlled to ensure equal illumination in front of and behind the modified LCD panel providing the dynamic mask.

In practice or operation of a display system and its display controller, for each frame of animation, color, depth map, and mask images are rendered for computing the multiplanar antialiasing. The front panel composite may, for example, be created as follows: the color image is converted to a Lab* color space, the intensity (L) is multiplied by the corresponding depth map, and the resulting image is converted back to RGB color space. Images for the rear panel composite are similarly created except the intensity (L) of the color image is multiplied by the complement of the corresponding depth map. Using Quartz Composer (or another software program/tool) running on a Mac Pro tower (or other controller or computer), sequential frames of the front and rear images were displayed on a single large window spanning two displays using a Matrix Dual-Head-2-Go adapter or the like.

With the display system 300 and a multiplanar display, the resulting virtual character or object appears as a solid, dimensional object, without the need for viewers to wear 3D glasses. The viewer's eyes will both point and focus at the appropriate location. In comparison, other autostereoscopic displays (e.g., lenticular-based, parallax-barriers, and other displays) often lack the simultaneous pointing and focusing of the viewer's eyes, which can lead to eye strain for the viewers.

While useful in many applications, the resulting virtual object typically will be viewable only from a relatively narrow view zone (e.g., about 15 degrees total or 7 to 9 degrees either direction from a preferred line of sight). Outside of this zone the front and back displays (or output front and rear virtual object images) no longer sufficiently match from a different viewpoint. This may limit the number of viewers and placement of the display. In other words, layers may only overlap from one viewpoint when a traditional multiplanar display is used to provide the dimensional virtual object (e.g., a person viewing outside the small field of view to the right may see the front layer or image separated to the left from the rear/back layer or image and vice versa if they move their head too far to the left).

To address the small field of view issue, an advanced Pepper's ghost display system may be provided that replaced the multiplanar display (or display assembly) with a "multi-view, multiplanar" display (or display assembly or source of the dimensional virtual object). The multi-view, multiplanar display assembly is adapted to present appropriately aligned front and back (or rear) images depending upon the viewing angle. The display assembly maintains the simultaneously correct depth and focusing cues to the viewers' eyes while also providing output images that are viewable from a wide angle and by a larger number of viewers.

A large number of views are not required to provide depth and focusing cues because this is provided by the multiple layers (i.e., one view zone for each eye is not required). The view changes only to align the front and rear displays after a significant change in viewer position. The multi-view, multiplanar display assembly may be incorporated into the above described advanced Pepper's ghost display systems allowing dimensional virtual objects to be incorporated into real world or physical sets while being viewable from a large number of viewpoints without 3D glasses. With use of a multi-view, multiplanar display, front and rear layers (or images) can be readjusted or changed to overlap for each view (middle view, right view, left view, and the like). Images will appear dimensional for a larger viewing area. A large number of views for stereo viewing or motion parallax are not required as each view is a multiplanar image that exhibits dimensionality and parallax.

It will be understood that the display system 300 may be readily modified to include a multi-view, multiplanar display assembly. To this end, the virtual object display assembly 320 would be modified to replace the rear plane display element 322, front plane display element 340, beam splitter 330, and mask(s) 326 with an embodiment of a multi-view, multiplanar display assembly (such as one described below). In general, a simple multiplanar display assembly includes a partially transparent mirror (or beam splitter) to optically layer two 2D images from the screens of two display elements/monitors. In this way, images from one display element are perceived to be slightly in front of images from the other display element (e.g., one display's virtual position is slightly in front of the other display). To create a multi-view, multiplanar display, two multi-view display devices or elements are optically layered with one spaced in front of the other, and, as discussed below, this may be achieved in numerous manners to practice the advanced Pepper's ghost display systems of the present invention.

Figure 4:
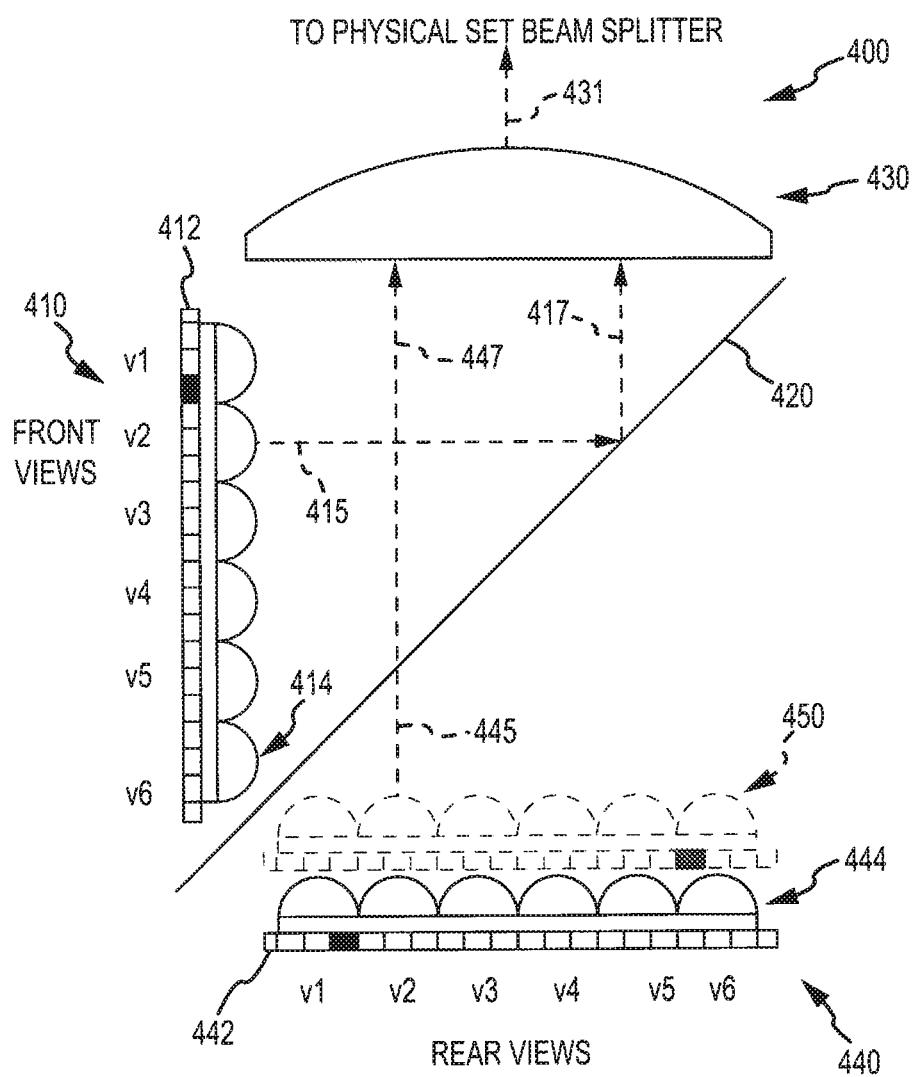
FIG. 4 illustrates a multi-view, multiplanar display assembly that may be incorporated into an advanced Pepper's ghost display system, such as within the virtual object display assemblies of FIG. 3, to overcome issues with a narrow view zone.

FIG. 4 illustrates one assembly 400 that may be included in a display system, such as systems 200 and 300, to provide a multi-view, multiplanar display of a virtual object, which can be inserted into a physical set/scene for view by a viewer. As shown, output or projected light 431 from the assembly 400 is directed toward beam splitter in a physical set or scene (such as toward beam splitter 230) where it is reflected toward a viewer (such as viewer 205) with light from objects in the physical set/scene to create a 3D Pepper's ghost effect or display viewable from a wide viewing zone.

In the implementation 400, a front (or front plane) display element 410 and a rear (or rear plane) display element 440 are provided and arranged to be generally orthogonal to each other. A beam splitter (such as a half-silvered mirror or the like) 420 is positioned between the two display elements 410, 440 such as at a 45-degree angle. The assembly 400 further may include an output lens 430 that may take the form of an integrating lens 430 that is arranged to receive light/images 415, 417 reflected and transmitted, reflectively, from the beam splitter 420 and direct or focus the integrated light/images 431 onto a viewer's eyes or outer side of a beam splitter in the physical set or scene (e.g., splitter 230 of system 300).

As shown, each display element 410, 440 includes a monitor or screen 412, 442 such as an LCD monitor or similar image display screen/device. The LCD monitors 412, 442 are operated or programmed (such as via display controller 240) to present multiple views of the virtual object at the appropriate plane (e.g., front and rear planes). These multiple views are tiled (e.g., horizontally or in a grid) on the screens 412, 442, with six views being shown to make the display elements 410, 440 "multi-view" devices but this number of views may be varied to practice the assembly 400 (e.g., 3 to 8 or more views).

A lens array 414, 444 is placed over the screen or monitor 412, 442 such that a lens is positioned over each front/rear plane view of the virtual object (or "ghost"). The lens arrays 414, 444, thus, act to create a projector for each planar view of the virtual object. This can be seen with the lens array 414 projecting the second view of the front plane image with light stream 415 via one of its lenses, the light associated with this view of the front plane image is reflected from the beam splitter 420 and then directed at 417 to the output lens 430. Concurrently, light 445 associated with the second view of the rear plane image is projected by a lens of the lens array 444 covering screen/display 442 is transmitted or projected to the beam splitter 420 where a portion 447 passes through to reach the output lens 430. Likewise, while not shown, light associated with the other views of the virtual object would be projected from each of the other lenses of the arrays 414, 444 to provide multiple views of the object for each of the front and rear planes. At 450, the apparent position of the reflected front display element 410 is shown, which occurs due to the front display element 410 being a small distance (i.e., the intended "thickness" of the displayed virtual object) closer to the beam splitter 420.

The multi-view, multiplanar display assembly 400 may be considered an integral imaging version or embodiment. The output lens 430 may be an integrating lens that is placed in front of the collection of "projector" lenses directing light 415, 445 from the arrays 414, 444 and from each view so the views of the images overlap spatially in one plane but propagate in different directions. The resulting image 431 appears to come from one location but changes as the viewpoint moves. The front and rear multi-view display elements 410, 440 are layered optically using a beam splitter 420 such as one in the form of a partially transparent mirror.

Figure 5:
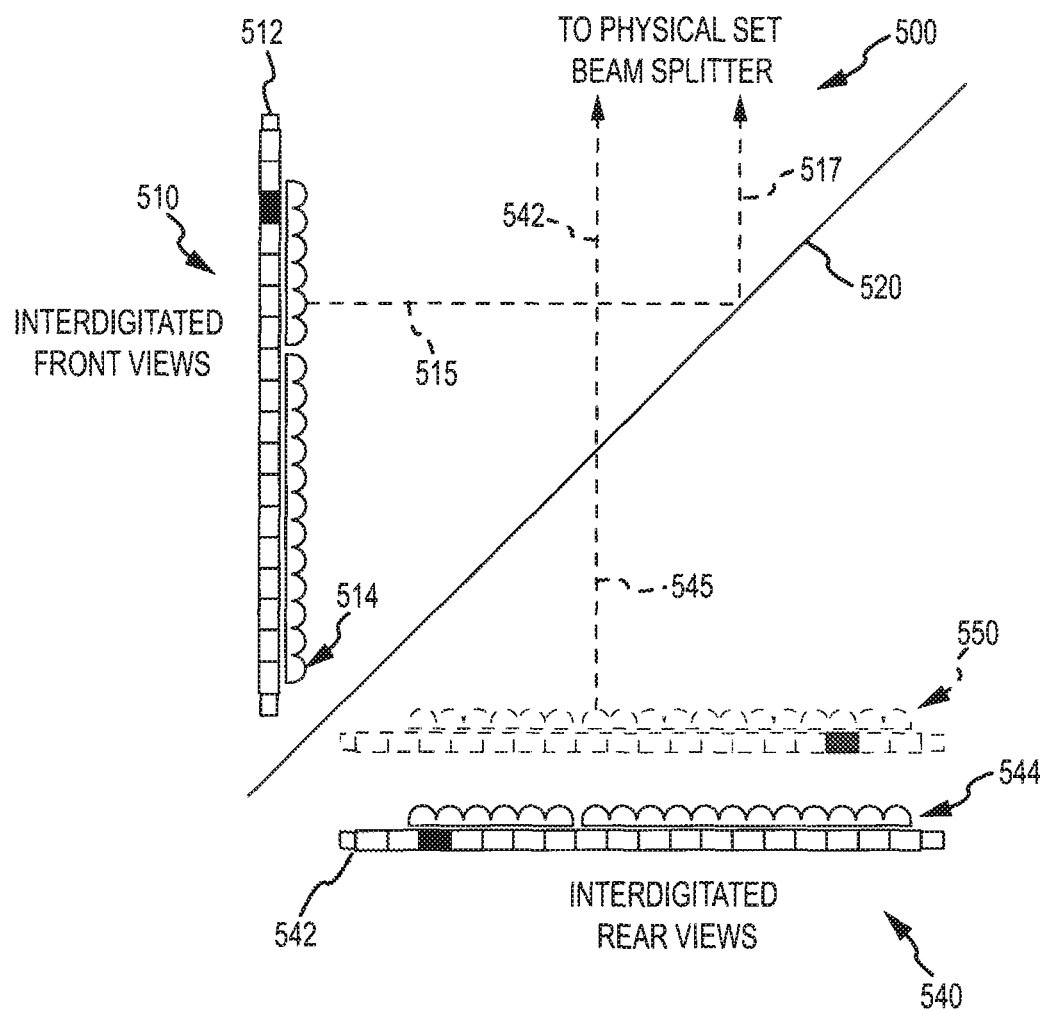
FIG. 5 illustrates another multi-view, multiplanar display assembly that differs from the assembly FIG. 4 in that an array of lenslets or lenticules are provided over each display and the front and rear plane images are displayed through these lenslets or lenticules to provide multiple views without the need for an integrating/output lens.

FIG. 5 illustrates another useful embodiment of a multi-view, multiplanar display assembly 500 that may be used to provide dimensional images 517, 547 to a beam splitter (such as splitter 230 of FIGS. 2 and 3) in an advanced Pepper's ghost display system. The assembly 500 may be considered a lenticular version. Front and rear plane display elements 510, 540 are again provided and arranged with their display screens (e.g., LCD monitors) 512, 542 orthogonal to each other, and a beam splitter 520 is provided at a 45-degree angle between the two display elements 510, 540. The front plane display element 510 is a small amount or distance closer to the beam splitter 520 such that its images appear a distance (a 3D object's thickness/depth) in front of those from the rear plane display element 540.

In each display element 510, 540, a lenslet array 514, 544 such as a lenticular sheet or fly-eye's array is placed over each display screen 512, 542. Each of the lenslets (or lenticules) of the lenslet arrays 514, 544 covers multiple display pixels in the screens 512, 542. As a result, each lenslet acts as a super pixel, with the location of the sub-pixel (display pixel) under the lenslet or lenticule determining the direction the projected or displayed light propagates.

To provide "multi-views," the multiple views provided by the display elements 510, 540 are interdigitated (such as by or in the feed from the display controller) such that each view is dispersed amongst lenslets or lenticules (e.g., one view pixel per super-pixel). Views of the virtual object at the front and back planes are collated according to view direction. The resulting images 515, 545 appear to come from one location but change as the viewpoint moves. The front plane and rear plane display elements 510, 540 are layered optically using the beam splitter 520 (e.g., a partially transparent mirror) that reflects a portion of light 515 from the front plane display element 510 as shown at 517 and transmits a portion of light 545 from the rear plane display element 540 as shown at 547. Note, lenslets such as in a fly's-eye type array may be useful to get up and down fields of view as well as the left and right views (to which a lenticular array is typically limited).

Although the invention has been described and illustrated with a certain degree of particularity, it is understood that the present disclosure has been made only by way of example, and that numerous changes in the combination and arrangement of parts can be resorted to by those Skilled in the art without departing from the spirit and scope of the invention, as hereinafter claimed. For example, programmable lighting using a projector to mask the light that would be occluded by the virtual object may be used for far off-axis light. Further, in some embodiments, the multiplanar display assemblies are provided using an autostereoscopic display using multiple projectors with an integrating lens. In some cases, though, the multi-view effect is achieved using a parallax barrier.

With the use of a dynamic mask in the physical set or scene, physical props can be placed and moved and lighting direction changed with little regard to the rest of the scene and props. Alignment of the virtual objects displayed and their corresponding dynamic masks is done on a object-by-object basis. Virtual models of the scene and tracking of user viewpoint is not required. For the displayed virtual objects, occlusion and shadows occurs naturally such that the virtual object or character becomes an independent object. Although the multiplanar display's front and rear images may become unaligned for off-axis views, the useable field of view is about plus/minus 9 degrees, which is adequate at least for a single casual viewer with some affordance for head movement to observe parallax in the scene or for two to three fixed viewers to get a sense of dimensionality.

As discussed above, a dimensional character or object may be provided through the use of a multiplanar display such as one formed with two (or more) optically layered 2D displays. A partially transparent mirror reflects one display so its virtual position is slightly in front of the second display. Alternatively, two transparent emissive displays (e.g., OLED displays) may be directly stacked or projecting may be provided on two spaced-apart scrims. To produce a smooth depth variation, a virtual pixel can then be placed anywhere between these two planes/display screens by splitting the virtual pixels intensity based on depth, e.g., if the pixel is to be located at a point half way between the two displays, half the pixel's intensity will be displayed on the back or rear display and half the pixel's intensity will be displayed on the front display.

In some embodiments, a system is provided that includes and uses a transparent emissive display such as a transparent OLED or a UV image projection onto a phosphor screen (single or multiple planes) instead of using a beam splitter and traditional, nontransparent display. In other words, the system may use an emissive display (e.g., nearly any kind) and a mask (e.g., nearly any kind).

From the above description and accompanying figures and claims, it can readily be seen that the inventors have designed or created an advanced Pepper's ghost projection system that has a number of unique features. The system may be thought of as simply including an image display plus mask and phantom objects. The image display can be 2D or autostereo 3D, and it may be either beam split in or transparent emissive. The mask can be an LCD panel or any other type of transparent/opaque display. In some cases, the image and mask are co-located either virtually (through a beam-splitter arrangement) or physically (with a combination of transparent emissive displays and a transparent/emissive mask).

With a beam-splitter arrangement, phantom objects are placed in front of the image display (in its space) in corresponding locations to physical objects in the sets (between the mask and the beamsplitter) that would occlude the character. Phantom objects can be 2D silhouettes (either physical or LCD panels) or physical 3D objects. One implementation of the autostereo 3D is a multiplanar display and others include a swept volume volumetric display and light field displays. To increase the field of view of the multiplanar display, lenticulars or lens arrays plus an integrating lens may be used.

We claim:

1. An apparatus for displaying images within a physical set, comprising:
   a set assembly including at least one physical object; and
   a virtual object display assembly, comprising:
      a display element with a screen operable to display an image of an object; and
      a mask display element positioned within the set assembly at an image plane associated with the displayed image, the mask display element operating, when the display element operates to display the displayed image, to display a mask corresponding to the displayed image,
   wherein the displayed mask occludes a portion of the physical object and casts a shadow within the set assembly and
   wherein the displayed mask has a shape, size, and orientation matching the displayed image in the image plane.

2. The apparatus of claim 1, the virtual object display assembly further including a beam splitter positioned at an angle between the screen and the set assembly,
   wherein the beam splitter is at least partially transmissive and reflective of light and wherein an outer surface of the beam splitter reflects light from the display element including the displayed image away from the set assembly and
   wherein the mask display element is positioned between the beam splitter and the physical object in the set assembly.

3. The apparatus of claim 2, wherein the beam splitter comprises a planar sheet of material and has a transmissivity to light of about 50 percent.

4. An apparatus for displaying images within a physical set, comprising:
   a set assembly including at least one physical object; and
   a virtual object display assembly, comprising:
      a display element with a screen operable to display an image of an object;

a mask display element positioned within the set assembly at an image plane associated with the displayed image, the mask display element operating, when the display element operates to display the displayed image, to display a mask corresponding to the displayed image; and a beam splitter positioned at an angle between the screen and the set assembly, wherein the displayed mask occludes a portion of the physical object and casts a shadow within the set assembly, wherein the beam splitter is at least partially transmissive and reflective of light, wherein an outer surface of the beam splitter reflects light from the display element including the displayed image away from the set assembly, wherein the mask display element is positioned between the beam splitter and the physical object in the set assembly, wherein the set assembly further includes an additional physical object positioned at a location between the mask display element and the beam splitter and wherein the virtual object display assembly further includes an occluding mask positioned between the display element screen and the beam splitter at a location corresponding to the location of the additional physical object relative to the beam splitter, the occluding mask having a size and shape corresponding with the additional physical object.

5. The apparatus of claim 4, wherein the occluding mask blocks a portion of light of the displayed image from striking the beam splitter.

6. The apparatus of claim 2, wherein the screen is orthogonal to the mask display element and wherein the beam splitter is positioned between the screen and the mask display element at an angle of about 45 degrees measured relative to the screen.

7. The apparatus of claim 1, wherein the mask display element comprises a plurality of pixels selectively operable to be transparent or to at least partially block light, the pixels associated with the displayed mask being programmed to at least partially block light.

8. The apparatus of claim 7, wherein the pixels comprise liquid crystal pixels.

9. A 3D display system, comprising:

a set with at least one physical prop;

a beam splitter positioned between a viewing area and the set, the beam splitter being at least partially transmissive and reflective;

a display assembly projecting an autostereoscopic 3D image toward an outer surface of the beam splitter, wherein the beam splitter reflects at least a portion of the multiplanar image toward the viewing area; and a mask display element positioned in the set at an image plane associated with the 3D image, the mask display element operating, when the display assembly operates to display the 3D image, to display a mask corresponding to a size and shape of the 3D image, wherein the mask display element is positioned between the beam splitter and the physical object in the set assembly and wherein the displayed mask occludes a portion of the physical object and casts a shadow within the set assembly.

10. A 3D display system, comprising:

a set with at least one physical prop;

a beam splitter positioned between a viewing area and the set, the beam splitter being at least partially transmissive and reflective; and a display assembly projecting an autostereoscopic 3D image toward an outer surface of the beam splitter, wherein the beam splitter reflects at least a portion of the multiplanar image toward the viewing area and wherein the display assembly includes:

a rear plane display element with a screen displaying a rear portion of the 3D image;

a front plane display element with a screen, orthogonal to the screen of the rear plane display element, displaying a front portion of the 3D image; and a second beam splitter positioned at an angle between the screens of the front plane and rear plane display elements, light reflected by and transmitted through the beam splitter providing the 3D image.

11. The system of claim 10, wherein the set further includes a foreground prop positioned between an image plane of the 3D image in the set and the beam splitter, and wherein the display assembly includes at least one occluding mask, comprising a silhouette of the foreground prop, positioned between the second beam splitter and the front plane and rear plane display elements to block a portion of at least one of the front and rear portions of the 3D image.

12. The system of claim 10, wherein the beam splitter and the second beam splitter are arranged to be in parallel planes.

13. The system of claim 10, wherein the front plane and rear plane display elements further include an array of lenses positioned over the screen, wherein the screens are operated to display differing views of the front and rear portions of the 3D image under each of the lenses, and wherein the display assembly further includes an output lens integrating output of the lenses and positioned between the second beam splitter and the outer surface of beam splitter.

14. The system of claim 10, wherein the screen of the front plane display is covered with a plurality of lenslets or lenticules, wherein the screen of the front plane display is operated to display a plurality of interdigitated views of the front portion of the 3D image, wherein the screen of the rear plane display is covered with a plurality of lenslets or lenticules, and wherein the screen of the rear plane display is operated to display a plurality of interdigitated views of the rear portion of the 3D image.

15. A 3D display system, comprising:

a set with at least one physical prop;

a beam splitter positioned between a viewing area and the set, the beam splitter being at least partially transmissive and reflective; and a display assembly projecting an autostereoscopic 3D image toward an outer surface of the beam splitter, wherein the beam splitter reflects at least a portion of the multiplanar image toward the viewing area and wherein the 3D image comprises multiple pairs of overlapping front and rear views.

16. An advanced Pepper's ghost display system, comprising:

a set structure including a viewing port, a background object, and a foreground object; and at an image plane between the background and foreground objects, a dynamic mask element selectively operable to display a mask providing a silhouette of a virtual object, the displayed mask at least partially blocking light, whereby the displayed mask occludes a portion of the background object from view through the viewing port and casts a shadow within the set structure.

17. The system of claim 16, further comprising a transparent emissive display element proximate to the dynamic mask element in the set structure, the transparent emissive display element being selectively operable to display an image in the set structure.

18. The system of claim 17, wherein the transparent emissive display element comprises a transparent OLED or a phosphor screen receiving a UV projection.

19. The system of claim 16, further including a pane of material, which is partially reflective and partially transmissive to light, positioned in the set structure between the viewing port and the background and foreground objects.

20. The system of claim 19, further including a multiplanar display displaying a multiplanar image to the pane in the set structure, whereby at least a fraction of light associated with the multiplanar image is reflected from an outer surface of the pane toward the viewing port.

21. The system of claim 20, wherein the multiplanar display comprises a first display with a first screen and a second display with a second screen orthogonal to the first screen, and further comprises a beam splitter positioned at an angle of about 45 degrees between the first and second screens and wherein the first screen displays a rear plane image of the multiplanar image, the second screen displays a front plane image of the multiplanar image, light from the first screen is transmitted through the beam splitter to the outer surface of the pane, and light from the second screen is reflected by the beam splitter toward the outer surface of the pane.

22. The system of claim 21, wherein the multiplanar display further includes at least one occluding object positioned between the second screen and the beam splitter, the occluding object has a shape and size corresponding to the foreground object and blocks a portion of the light from the second screen corresponding to the front plane image.

23. The system of claim 21, wherein the first display and the second display provide multiple paired views of the front and rear plane images, whereby the multiplanar image is dimensional with the paired views overlapping over a field of vision greater than at least 15 degrees.

24. The system of claim 17, wherein the foreground object has a side facing the dynamic mask element that is darkened, whereby reflections of the foreground object from the dynamic mask element are limited.

* * * * *